3,005,680
Patented Oct. 24, 1961

3,005,680
METHOD OF SEPARATING NEPTUNIUM FROM PLUTONIUM IN AQUEOUS INORGANIC SOLUTION
Glenn T. Seaborg, Berkeley, Calif., assignor to the United States of America as represented by the United States Atomic Energy Commission
No Drawing. Filed Feb. 2, 1948, Ser. No. 5,891
2 Claims. (Cl. 23—14.5)

This invention relates to a process for separating neptunium and plutonium.

When uranium compositions are subjected to the action of neutrons as in a neutronic reactor, $U^{238}$ captures a neutron and forms $U^{239}$. This is a short-lived isotope of uranium which decays promptly to $Np^{239}$. This isotope of neptunium is a short-lived beta emitter which decays to plutonium, $Pu^{239}$.

When such neutron bombarded uranium is allowed to age after bombardment for a number of months, most of the neptunium shall have decayed and plutonium essentially free of neptunium is present. However, when only a short period of cooling or decay is used, neptunium will be present. In addition other isotopes of neptunium will be found which have longer half lives than does $Np^{239}$.

It is an object of this invention to provide a composition comprising neptunium essentially free of plutonium.

A further object of this invention is to provide a means of separating neptunium from plutonium.

In accordance with this invention neptunium and plutonium are separated by contacting a solution containing these elements in their reduced states with an oxidizing agent having a standard oxidation-reduction potential substantially more negative than minus one volt and having a negligible oxidation rate for plutonium and a substantial oxidation rate for neptunium, adding a carrier that will carry from solution these elements only when present in an oxidation state not greater than four, and thereafter separating the precipitate from the supernatant.

It has been found that plutonium is chemically unlike osmium in many respects, and is probably a member of a second rare earth group, the actinide series. It has further been discovered that plutonium, unlike a number of other members of this series, possesses a plurality of valence states. Plutonium has at least four valence states, including +3, +4, +5, and +6. In 0.5 M–1.0 M aqueous hydrochloric acid the oxidation-reduction potentials are of the following magnitudes:

| | Volts |
|---|---|
| $Pu^{+3} \rightarrow Pu^{+4} + E^-$ | −0.97 |
| $Pu^{+4} + 2H_2O \rightarrow PuO_2^+ + 4H^+ + E^-$ | −1.11 |
| $PuO_2^+ \rightarrow PuO_2^{+2} + E^-$ | −0.92 |
| $Pu^{+4} + 2H_2O \rightarrow PuO_2^{+2} + 4H^+ + 2E^-$ | −1.015 |

As may be seen from the above couples, the stability of the higher oxidation states is dependent on the hydrogen ion concentration. In moderately acidic solutions the $Pu^{+5}$ ion is generally very unstable, and disproportionates to $Pu^{+4}$ and $Pu^{+6}$. The $Pu^{+4}$ ion is capable of disproportionating to the $Pu^{+3}$ ion and the $PuO_2^{+2}$ ion, and in dilute aqueous hydrochloric acid this disproportionation may take place to a considerable extent. The $Pu^{+4}$ disproportionation is opposed, however, by increase in hydrogen ion concentration and by the presence of ions which tend to complex or otherwise stabilize the $Pu^{+4}$ ion. The effect of additional ions in hydrochloric acid solutions is illustrated by the following potentials for the $Pu^{+3} \rightarrow Pu^{+4}$ couple:

| | Volts |
|---|---|
| 1.0 M HCl | −0.97 |
| 1.0 M HCl–0.1 M $H_3PO_4$ | −0.80 |
| 1.0 M HCl–1.0 M HF | −0.53 |

Generally the anions of slightly ionized acids tend to complex the $Pu^{+4}$ ion to a much greater extent than the anions of highly ionized acids. Thus, $Pu^{+4}$ is only slightly complexed by $ClO_4^-$, $Cl^-$, and $NO_3^-$; it is complexed to a much greater extent by $SO_4^{-2}$; and it is very strongly complexed by $PO_4^{-3}$, $F^-$, $C_2H_3O_2^-$, and $C_2O_4^{-2}$.

In addition to the complexing effect of the anions of the acids employed as solvents for plutonium, certain of these acids may also serve as oxidizing agents. However, at room temperatures, or moderately elevated temperatures, and in the absence of oxidation catalysts, the rate of oxidation by the acid is often so low that this effect may be ignored. Thus, the $Pu^{+4}$ ion is stable for considerable periods of time in perchloric acid, although under proper conditions, the latter is capable of oxidizing $Pu^{+4}$ to $PuO_2^{+2}$. It is therefore desirable to control the state of oxidation of the plutonium by the use of oxidizing agents and reducing agents which have rapid reaction rates under the conditions employed for processing the solutions.

The $Pu^{+4}$ ion may suitably be oxidized to the $PuO_2^{+2}$ ion by the addition of an active oxidizing agent having an oxidation-reduction potential substantially more negative than the oxidation-reduction potential of the $Pu^{+4} \rightarrow PuO_2^{+2}$ couple in the particular solution employed. The following are representative potentials for this couple:

| | Volts |
|---|---|
| 1.0 M HCl | −1.0 |
| 1.0 M $HNO_3$ | −1.1 |
| 1.0 M $H_2SO_4$ | −1.3 |

Oxidizing agents having adequate oxidation-reduction potentials for use in such solutions may be chosen by reference to tables such as the table of standard oxidation-reduction potentials given in the Reference Book of Inorganic Chemistry by Latimer and Hildebrand (The MacMillan Company, New York, 1934).

It is generally desirable to effect purification and concentration of plutonium in nitric acid solutions. Examples of oxidizing agents for use in such solutions are bromates, permanganates, dichromates, silver-catalyzed peroxydisulfates, and ceric compounds. To effect the oxidation, a quantity of oxidizing agent at least equivalent to the amount of plutonium is added to the solution, and the resulting mixture is digested at a moderately elevated temperature for a sufficient period of time to insure complete oxidation of the plutonium. In most cases, this digestion may suitably be effected at 60–80° C. for 15–60 minutes. In order to maintain the plutonimum in the hexavalent state for considerable periods of time after oxidation, it is desirable to employ an excess of oxidizing agent to serve as a holding oxidant. This is especially true if an acid solution is to be processed in ferrous metal equipment, or under other conditions permitting subsequent reduction of the plutonium.

Neptunium may be oxidized by any of the oxidizing agents mentioned above, without the necessity of digestion at an elevated temperature. This greater rapidity of oxidation of neptunium at low temperatures may be utilized to effect preferential oxidation of neptunium without substantial oxidation of plutonium. The preferred oxidizing agent for this purpose is the bromate ion. At temperatures of 15–25° C. neptunium may be substantially completely oxidized by alkali metal bromates in nitric acid solutions, which contain ions such as $SO_4^{-2}$ ions to complex +4 plutonium, without appreciable oxidation of plutonium to the hexavalent state. There is some evidence that bromate oxidation of plutonium may be catalyzed by cerium, and it is therefore desirable to effect the preferential oxidation of neptunium in cerium-free solutions.

For the reduction of plutonium, reducing agents of adequate potential may be selected by reference to tables of standard potentials such as the table previously referred to. The reduction may suitably be effected by digestion at room temperature or slightly elevated temperatures. Digestion for 15 to 60 minutes at 15 to 35° C. will generally be satisfactory.

For the reduction of $PuO_2^{+2}$ or $Pu^{+4}$ to $Pu^{+3}$, the reducing agent should have an oxidation-reduction potential substantially more positive than the oxidation-reduction potential of the $Pu^{+3} \rightarrow Pu^{+4}$ couple in the solution employed. Thus, in 1.0 M HCl an active reducing agent having a potential more positive than $-0.97$ v. will be required, and in 1.0 M $HNO_3$, a potential more positive than $-0.92$ v. will be necessary. In order to maintain the plutonium in the $+3$ valence state for appreciable periods of time, it is desirable to maintain an excess of the reducing agent in solution.

In order to reduce $PuO_2^{+2}$ to $Pu^{+4}$ without reducing $Pu^{+4}$ to $Pu^{+3}$, it is desirable to employ an active reducing agent having an oxidation-reduction potential substantially more positive than the oxidation-reduction potential of the $Pu^{+4} \rightarrow PuO_2^{+2}$ couple, and substantially more negative than the oxidation-reduction potential of the $Pu^{+3} \rightarrow Pu^{+4}$ couple, in the solution used. A wider selection of reducing agents of the desired potential will be available for use in solutions containing ions which complex the $Pu^{+4}$ ion than are available for use in solutions which are substantially free from complexing effects. Thus, in 1.0 M HCl and 1.0 M HCl–1.0 M HF, the oxidation-reduction potentials are approximately:

|  | 1.0 M HCl | 1.0 M HCl–1.0 M HF |
|---|---|---|
|  | V. | V. |
| $Pu^{+4} \rightarrow PuO_2^{+2}$ | $-1.0$ | $-1.2$ |
| $Pu^{+3} \rightarrow Pu^{+4}$ | $-0.9$ | $-0.5$ |

It may be seen that in the solution containing fluoride ion reducing agents such as hydrogen peroxide and ferrous iron, which have oxidation-reduction potentials of $-0.68$ v. and $-0.74$ v. respectively, will reduce $PuO_2^{+2}$ only to $Pu^{+4}$; whereas in the solution without fluoride ion to complex the $Pu^{+4}$ ion, these reducing agents will tend to reduce the plutonium to the $+3$ state. A reducing agent such as sulfur dioxide, having an oxidation-reduction potential of $-0.14$ v. will tend to reduce the plutonium to the $+3$ state in either solution.

When employing the preferred solutions of plutonium in aqueous nitric acid, the reduction of $PuO_2^{+2}$ to $Pu^{+4}$ is preferably effected in the presence of a complexing ion, employing reducing agents having oxidation-reduction potentials of the same magnitude as hydrogen peroxide and ferrous iron. However, it is also possible to use stronger reducing agents such as sulfur dioxide if any excess reducing agent is removed or destroyed after the initial reduction is effected. In any case, if $Pu^{+4}$ is desired, the hydrogen ion concentration should be sufficiently high to oppose the disproportionation of $Pu^{+4}$ to $Pu^{+3}$ and $PuO_2^{+2}$. For this purpose, it is desirable to employ solutions having a pH not substantially above 2, and preferably considerably below 1. In the case of aqueous nitric acid solution, it is generally desirable to maintain a free acid concentration of at least 1 M.

It will be apparent that the considerations discussed above will also apply to the oxidation of $Pu^{+3}$ to $Pu^{+4}$, without oxidizing $Pu^{+4}$ to $PuO^{+2}$, by the use of oxidizing agents having potentials intermediate the potentials of the two plutonium couples.

The plutonium oxidation and reduction processes described above may be employed, if desired, for the simultaneous oxidation or reduction of both neptunium and plutonium. Such simultaneous oxidation or reduction will be attained provided equilibrium is reached. As previously pointed out, however, differential reaction rates may be utilized to attain one oxidation state for neptunium and another oxidation state for plutonium.

The solutions of plutonium ions of the various valence states described above are useful for the electro-deposition of plutonium, for the precipitation of plutonium compounds while leaving contaminating compounds in solution, and for the precipitation of contaminating compounds while leaving plutonium in solution, as will be discussed in detail in the description of other phases of the present invention.

The oxidation state of plutonium in aqueous solutions of the various plutonium cations may be determined in accordance with methods commonly used for the determination of the valence state of other metals in solution. Thus, the total plutonium in solution may be determined by quantitative gravimetric or radiometric analysis, and the percentage of any particular ion may then be determined by a suitable differential analysis, such as quantitative oxidation or reduction, polarographic analysis, or the like. Spectrophotometric analysis is especially advantageous for determining qualitatively or quantitatively the various plutonium ions in solution, in view of the sharp characteristic peaks in the absorption spectra for the different valence states. Representative molar extinction coefficients for the $Pu^{+3}$, $Pu^{+4}$, and $PuO_2^{+2}$ ions in aqueous inorganic acid solutions are given in the following tables:

TABLE 1

[$Pu^{+3}$ in 1 M HCl]

| Wave Length in A | 4,260 | 4,560 | 4,740 | 5,050 | 5,620 | 6,010 | 6,660 | 8,000 | 9,090 |
|---|---|---|---|---|---|---|---|---|---|
| Molar Extinction Coefficient | 12.0 | 4.7 | 4.0 | 3.5 | 37.4 | 37.9 | 15.0 | 15.0 | 18.9 |

TABLE 2

[$Pu^{+4}$ in 1 M $HNO_3$]

| Wave Length in A | 4,040 | 4,220 | 4,480 | 4,760 | 5,020 | 5,460 | 6,600 | 7,080 | 8,000 | 8,550 |
|---|---|---|---|---|---|---|---|---|---|---|
| Molar Extinction Coefficient | 27.0 | 24.5 | 17.5 | 72.5 | 8.7 | 17.0 | 31.0 | 14.0 | 18.9 | 13.2 |

TABLE 3

[$Pu^{+4}$ in 1 M $H_2SO_4$]

| Wave Length in A | 4,090 | 4,360 | 4,810 | 5,480 | 6,640 | 7,200 | 8,140 | 8,510 |
|---|---|---|---|---|---|---|---|---|
| Molar Extinction Coefficient | 29.2 | 28.5 | 85.2 | 20.0 | 39.6 | 21.0 | 27.1 | 14.3 |

TABLE 4

[$PuO_2^{+2}$ in 1 M $HNO_3$]

| Wave Length in A | 4,590 | 4,700 | 5,060 | 5,220 | 6,240 | 8,310 | 9,580 | 9,870 |
|---|---|---|---|---|---|---|---|---|
| Molar Extinction Coefficient | 15.0 | 14.0 | 14.0 | 14.0 | 10.0 | 171.0 | 23.0 | 17.0 |

The particular oxidizing and reducing agents, processes, and solutions discussed above are merely illustrative and are not to be construed as limiting the scope of this phase of the present invention. Other oxidizing and reducing agents having the required potentials may be utilized instead of those specifically mentioned, and the procedures may be modified in numerous respects, as will be evident to those skilled in the art.

A method for separating plutonium and neptunium from aqueous solutions containing uranium, neptunium, plutonium, and fission products is disclosed in copending application Serial Number 637,485, filed December 27, 1945, of which the present invention is a continuation-in-part. According to that invention, plutonium and neptunium are effectively separated from uranium and fission products by contacting a solution containing said elements with lanthanum ions and fluoride ions, thereby precipitating lanthanum fluoride which carries plutonium and neptunium also as fluorides. In this phase of the process neptunium and plutonium are in a valent state not greater than plus four. A separation of plutonium and neptunium from fission products of the rare earth type is effected by oxidizing the plutonium and neptunium to a valent state above plus four, adding lanthanum ions and fluoride ions which form a lanthanum fluoride precipitate thus carrying rare earth elements from solution, and then separating the supernatant solution, which contains substantially all the neptunium and plutonium from the precipitate.

The instant invention provides a means of separating neptunium from plutonium by oxidizing the neptunium and not the plutonium and then carrying out a lanthanum fluoride precipitation step thereby carrying down the plutonium and leaving the neptunium in solution.

Carriers other than lanthanum fluoride may be used in separating neptunium from plutonium by such a procedure. Thus, bismuth phosphate may be used to carry the plutonium from a solution containing plutonium in a valent state not greater than plus four and neptunium in a valent state greater than plus four.

The use of a carrier precipitate to separate plutonium from an aqueous solution, leaving neptunium in a higher oxidation state in the supernatant liquid, is illustrated by the following example:

Example 1

A 4.3 M sulfuric acid solution was prepared, containing lanthanum sulfate in a concentration of approximately 430 mg. per liter and plutonium and neptunium in tracer concentrations. To this solution was added about 2.1 times its volume of an aqueous solution 0.2 M with respect to bromate ion and 0.2 M with respect to bromine. The resulting solution, which had a lanthanum sulfate concentration of about 139 mg. per liter, and was about 1.4 M with respect to sulfuric acid, about 0.14 M with respect to bromate ion, and about 0.14 M with respect to bromine, was allowed to stand at room temperature for two hours to effect oxidation of the neptunium to the hexavalent state while leaving the plutonium in the tetravalent state. About 27% by volume of 48% aqueous hydrofluoric acid was then added to the solution, and the resulting lanthanum fluoride precipitate was separated by centrifuging. Analyses for alpha and beta radiation showed that the precipitate contained 99% of the plutonium which was present in the original solution, but only 0.74% of the neptunium.

What is claimed is:

1. A process for the separation of neptunium from plutonium in an aqueous inorganic solution containing neptunium, plutonium and sulphate ions, comprising contacting said solution with an alkali metal bromate, digesting the resulting mixture at a temperature of 15 to 25° C. for a period of time not more than that required to oxidize substantially all of the neptunium, adding lanthanum ions and fluoride ions, and separating the plutonium-containing precipitate thus formed from the supernatant solution.

2. A process for the separation of neptunium from plutonium in an aqueous inorganic solution containing neptunium, plutonium and sulfate ions, comprising incorporating in said solution an aqueous solution 0.2 M with respect to bromate ion and 0.2 M with respect to bromine, digesting the resulting mixture at a temperature of 15 to 25° C. for a period of time not more than that required to oxidize substantially all of the neptunium, adding lanthanum ions and fluoride ions, and separating the plutonium-containing precipitate thus formed from the supernatant solution.

References Cited in the file of this patent

UNITED STATES PATENTS

| 2,785,951 | Thompson et al. | Mar. 19, 1957 |
| 2,799,553 | Thompson et al. | July 16, 1957 |
| 2,811,415 | Seaborg | Oct. 29, 1957 |

OTHER REFERENCES

Seaborg and Wahl: Journal of the American Chemical Society, vol. 70, pp. 1128–1134 (1948).

Strassmann et al.: The Isolation and Some of the Properties of Element 93, Naturwissenschaften, vol. 30, pp. 256–260 (1942).

Seaborg et al., II: "The Transuranium Elements," part I, Paper No. 1.6 by Seaborg and Wahl, pp. 25–38. National Nuclear Energy Series, division IV, volume 14B (1949).